United States Patent

Granryd

[11] Patent Number: 5,692,810
[45] Date of Patent: Dec. 2, 1997

[54] HEAVY DUTY TRACTION INTENSIFYER INCLUDING FLEXIBLE FRAME MEANS WITH FLEX-LIMITING MEANS FOR AGRICULTURAL WHEELED TRACTORS, HARVESTING COMBINES AND THE LIKE

[76] Inventor: Thorvald G. Granryd, 124 W. Elizabeth St., #3D, Wilmington, Ill. 60481

[21] Appl. No.: 323,683

[22] Filed: Oct. 18, 1994

[51] Int. Cl.[6] .............................. B60B 15/10; B60C 27/20
[52] U.S. Cl. ................................ 301/41.1; 301/45
[58] Field of Search .................... 301/38.1, 40.1, 301/41.1, 44.1, 44.4, 45, 47, 50, 51; 152/5, 11, 12, 69, 80, 86

[56] References Cited

U.S. PATENT DOCUMENTS

| | | | |
|---|---|---|---|
| 1,497,092 | 6/1924 | Delieuvin | 301/45 |
| 1,992,079 | 2/1935 | Ludwick | 301/40.3 |
| 2,274,180 | 2/1942 | Zahradnik | 301/50 |
| 4,694,872 | 9/1987 | Granryd | 152/216 |
| 5,242,214 | 9/1993 | Granryd | 301/41.1 |

*Primary Examiner*—Russell D. Stormer

[57] ABSTRACT

Disclosed is a heavy duty retractable traction intensifyer for adding utility and maximizing performance of agricultural tractors, harvesting combines and the like. The device has a series of aggressive and thin spades, which in fields slice into stronger subsurface layer of soil, thereby increasing drawbar pull and decreasing wheel slip and soil compaction. The series of spades is arranged in groups, each secured to a length of sturdy wire rope which is threaded through a series of tubes, whereby each group can be rotated and thus expeditiously retracted for driving on roads. The series of tubes is the outermost portion of a flexible frame, bolted to an accompanying powered tire-wheel assembly via a spacer. For obtaining a comfortable ride during heavy pulling in fields said frame includes a series of resilient semicircle-shaped loops, formed from flat stock of high-strength spring-like steel, extending radially outward from a circular band forming the innermost portion thereof. For assuring satisfactory durability and reliability of the device said frame further includes various devices for keeping magnitude of flexing within safe limits and a spade-lock. The application of wire rope is as unique as it is useful. Not only does it provide a simple way of securing and supporting the series of spades but its inherent capacity for flexing is here fully utilized, resulting in the feature of ultra-quick conversion from "rubber-drive" for roads to "steel-drive" for fields and vice versa.

7 Claims, 6 Drawing Sheets

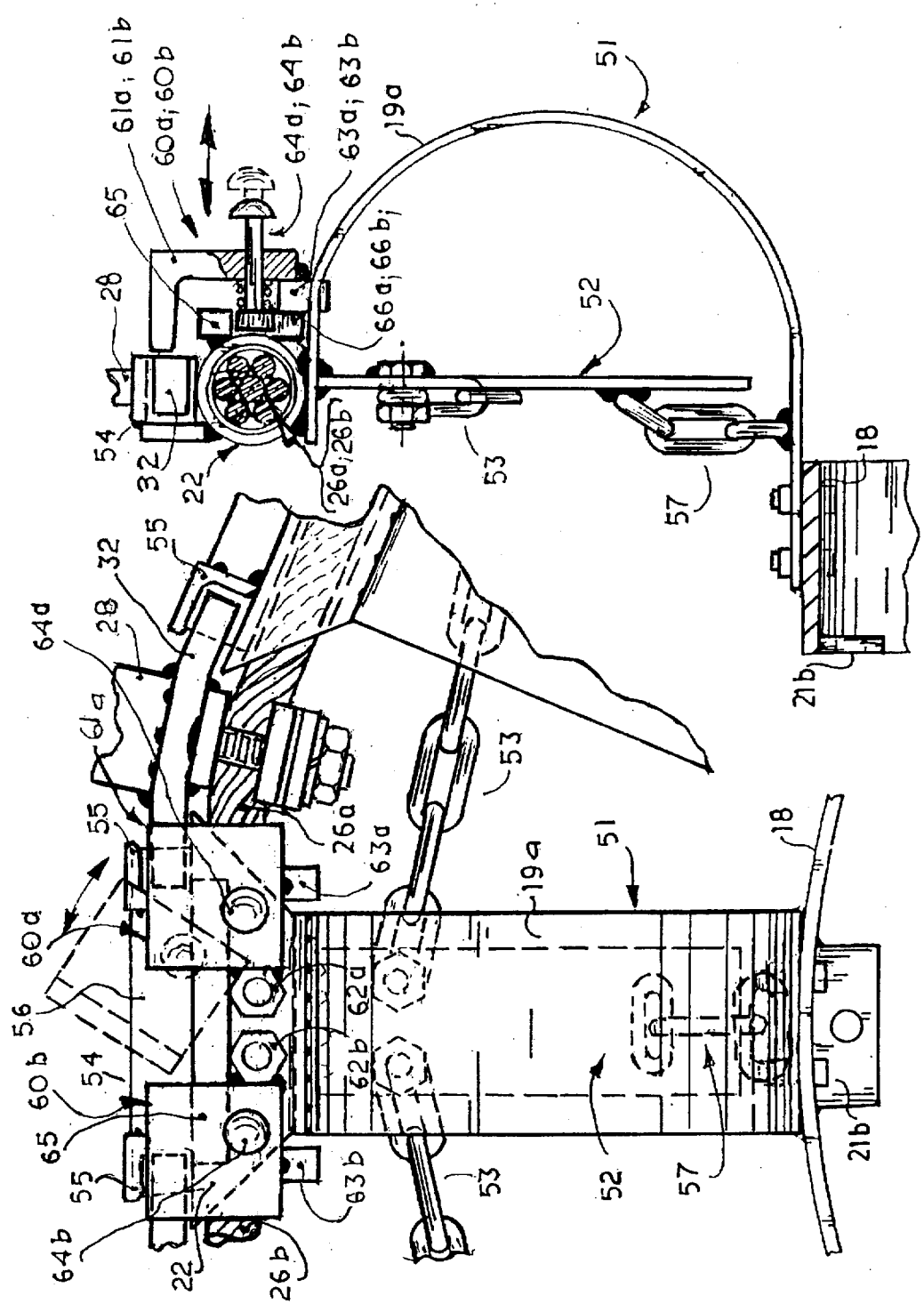

5,692,810

HEAVY DUTY TRACTION INTENSIFYER INCLUDING FLEXIBLE FRAME MEANS WITH FLEX-LIMITING MEANS FOR AGRICULTURAL WHEELED TRACTORS, HARVESTING COMBINES AND THE LIKE

BACKGROUND OF THE INVENTION

This invention relates generally to an apparatus and method for obtaining increased utility and improved tractive performance of agricultural wheeled tractors and of harvesting combines without sacrificing riding comfort during field operations and on-highway driving. Reference is made to the following U.S. Pat. Nos. 4,694,872, 4,402,357, 4,603, 916, 4,508,150, and 5,242,214 the disclosures of which are incorporated herein by reference.

The shortcomings of farm-tires during field operations are well known in the art. In the above disclosures their performance is reviewed and methods and means for improving productivity and reducing soil compaction are shown. Categorically, the products corresponding to the above patents have the U.S. trademark DYNA-BITE (Reg. No 1,424, 758).

Referring to the U.S. Pat. No. 5,242,214 there is disclosed a traction enhancing device including a flexible frame, a noteworthy difference in structure from that disclosed in the prior patents. This change in structure stemming from following observations obtained from extensive field testing: The DYNA-BITE approach—employing a series of aggressive and thin and retractable spades for solving a longstanding problem—was noted to cause objectionable vibration, not in "normal" field-conditions while operating at "normal" field-speeds, but when vehicles were operated at maximum practical field-speeds and when soil is hard. And thus, the method of employing a series of flexible frame-members— formed into semicircles from same flat-stock of high-strength, spring-like steel as are the spades—was conceived.

A further observation from said field-testing: Namely that farmers—having noted the remarkable effectiveness in fields of the Model DBFF (DYNA-BITE FLEXIBLE FRAME)—are also taking advantage of its capabilities in case of "emergency"-situations; such as, pulling out sunken and fully-loaded grain-carts from their fields and extricating heavy vehicles, stuck on ice-covered gravel-roads.

Such usage of a DBFF-equipped tractor imposes unforeseen high forces on the device as well as abnormal amount of deflection on its flexible frame-members, thus resulting in permanent deformation of same. The present invention addresses this reliability problem by adding flex-limiting means as well as other refinements, as described in the following.

SUMMARY OF THE INVENTION

It is therefore an object of this invention to attain outstanding traction characteristics of rubber tired vehicles.

It is another object to provide a smooth ride when pulling in soils even at maximum practicable field speeds.

It is yet another object to obtain satisfactory endurance characteristics even if subjected to abnormal usage.

It is a further object to increase productivity and improve fuel economy of agricultural wheeled vehicles.

It is yet a further object to reduce soil compaction and to extend tire life.

It is still another object to provide aggressive traction intensifying means having method and means for expedient conversion from "rubber-drive" on roads into "steel-drive" in fields and vice versa.

DESCRIPTION OF THE DRAWINGS

Further objects of the invention, together with additional features contributing thereto and advantages accruing therefrom, will be apparent from the following description of the preferred embodiments of the invention which are shown in the accompanying drawings with like numerals indicating corresponding parts throughout, wherein:

FIGS. 5A and 5B are detailed side and end views respectively of a spade-holder assembly and showing flex-limiting means and spade abutment means and spade locking means.

DESCRIPTION OF THE PREFERRED EMBODIMENT

Figure 1:
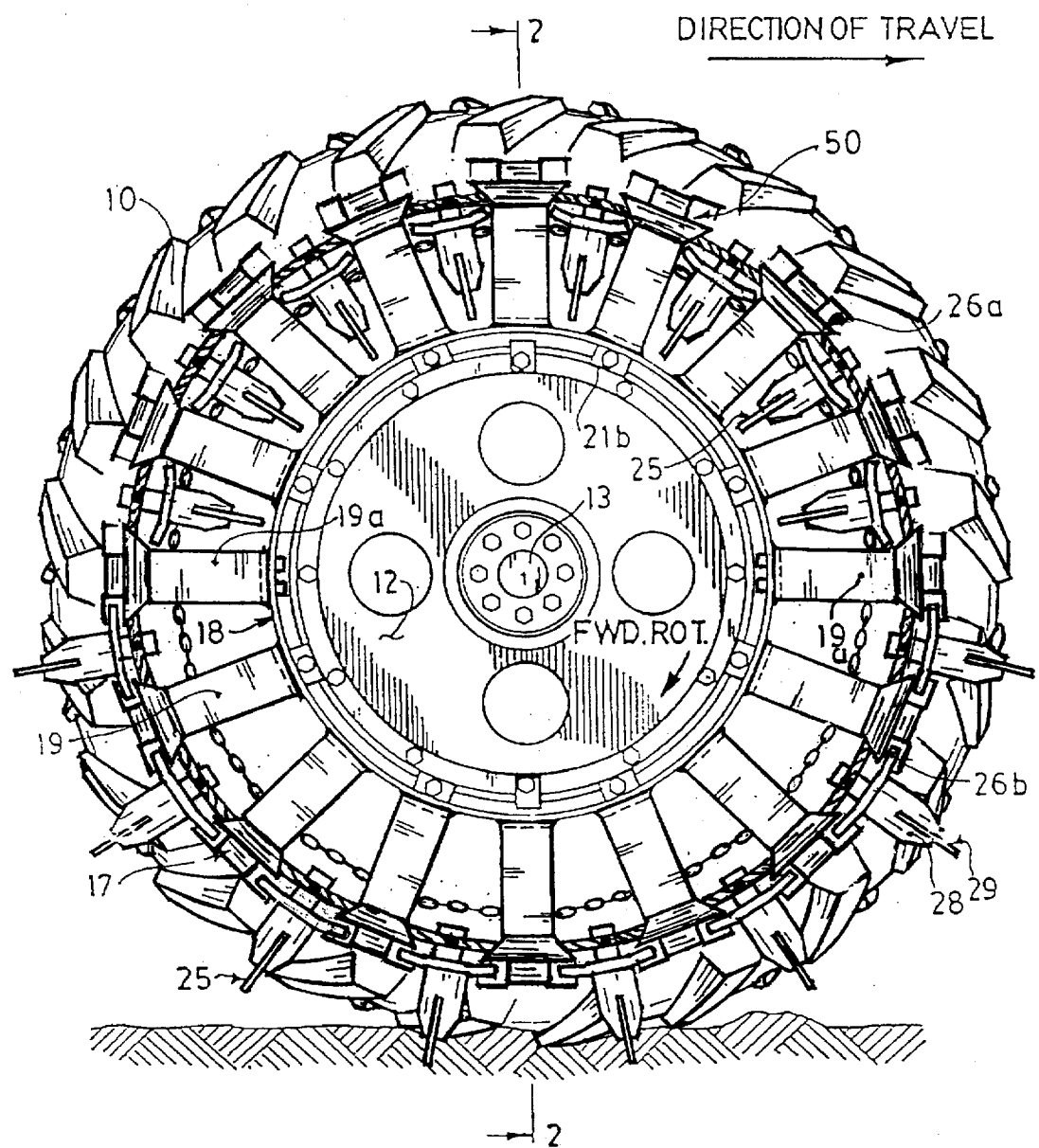
FIG. 1 is a side elevation of the device, together with an accompanying wheel-and tire-assembly, the device being shown with its spades engaged in the lower half of the drawing and with its spades retracted in the upper half.
Figure 2:
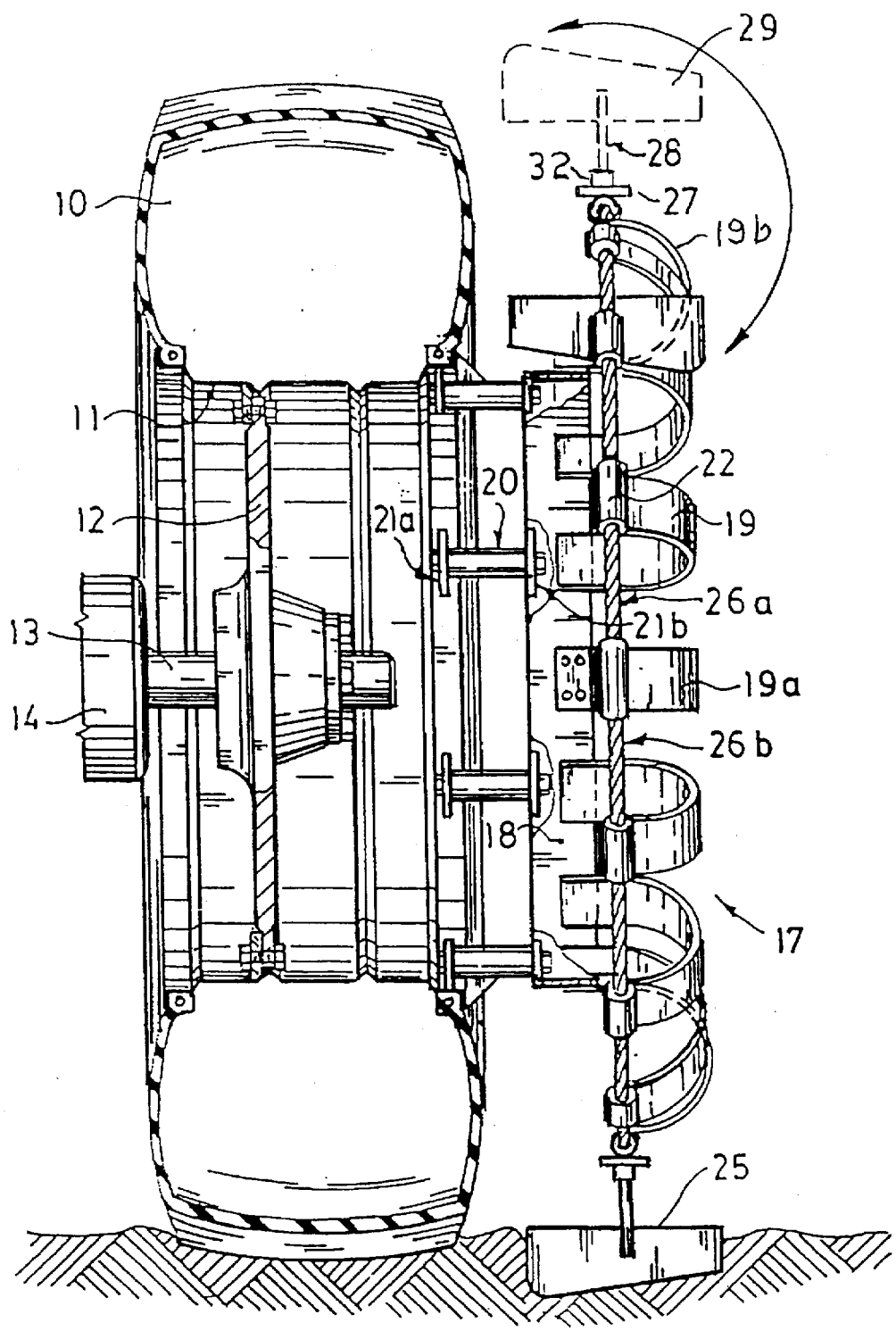
FIG. 2 is an end view of the device and its wheel-assembly of FIG. 1, with the tire shown in its section and some spades omitted for clarity.

Referring to FIGS. 1 and 2, there is shown a tire 10 mounted on rim 11. Rim 11 is secured to disc 12,which is secured to axle shaft 13, protruding from final-drive housing 14 of a tractor or a harvesting combine and the like. At edge of rim 11 is welded eight tabs 21a, equally spaced.

The traction intensifying device 17 comprises: a series of spade-assemblies 25; a like number of spadeholder-assemblies 19, 19a and 19b; a circular band 18 having eight tabs 21b; two each of wire rope 26a and 26b, to rotatably secure the spade-assemblies 25 with the spadeholder-assemblies 19, 19a and 19b.

The device 17 is bolted to rim 11 from the tabs 21a onto tabs tabs 21b, via the spacers 20.

The circular band 18 in conjunction with the series of spade-holder-assemblies 19, 19a and 19b, is here referred to as a flexible frame, 50.

Figure 3:
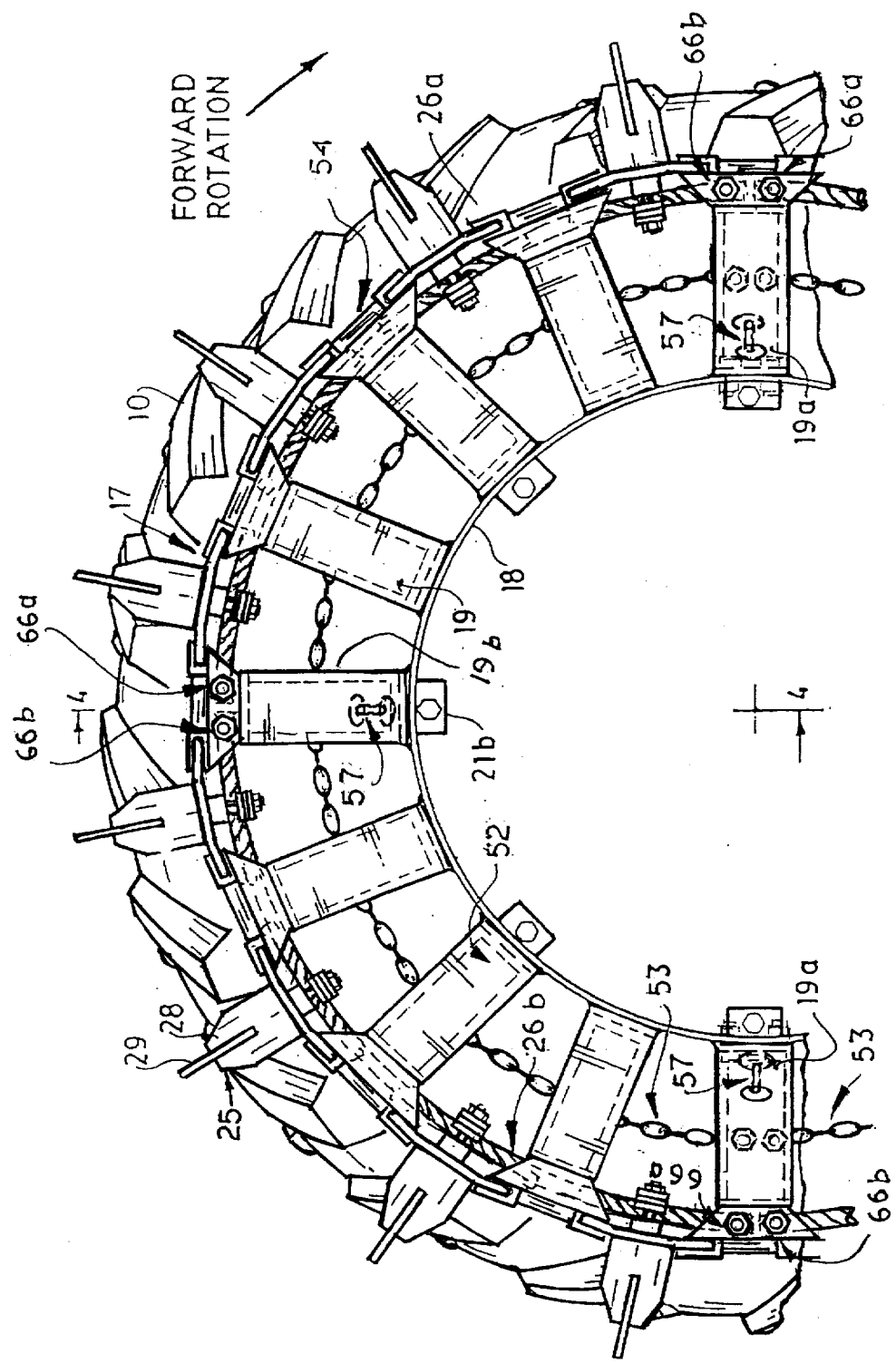
FIG. 3 is an enlarged partial side view of FIG. 1, showing means for flex-limiting and means for securing spade-locking, with wheel-assembly omitted for clarity.
Figure 4:
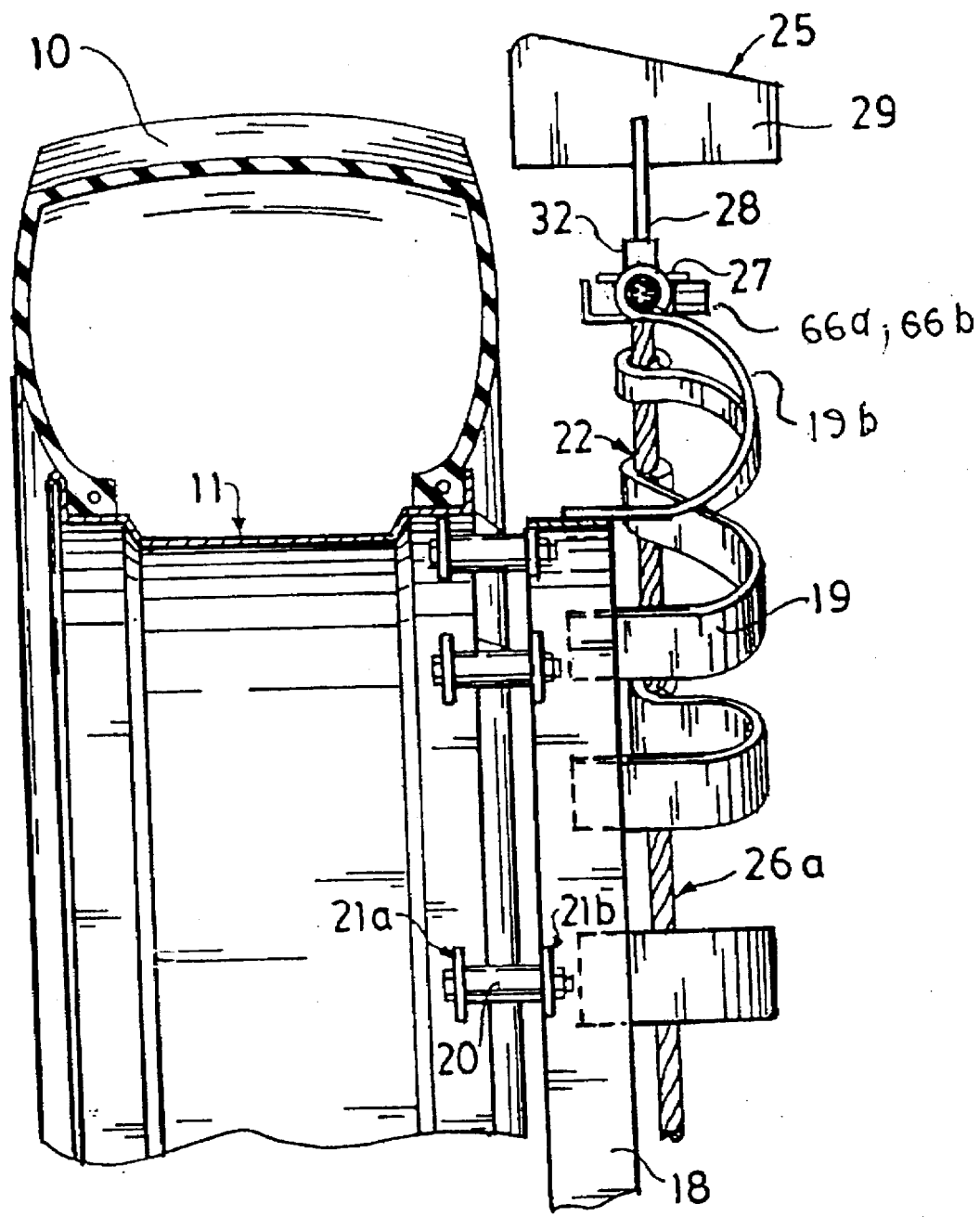
FIG. 4 is a sectional view taken along line 4—4 of FIG. 3 with flex-limiting means and all but one spade omitted for clarity.

As best shown in FIGS. 5A and 5B, the spadeholder-assemblies 19, 19a and 19b is composed of loop 51, tube 22 and vertical flexlimiter 52. The loop 51 is formed into a semicircle, as also shown in FIGS. 2 and 4, from flat stock of high strength spring-like steel. The tube 22, with its inside diameter providing ample space for the wire ropes 26a and 26b, is welded onto loop 51 at its outer end. Spadeholder-assemblies 19 and 19b are welded onto band 18, whereas the two 19a assemblies are bolted, as shown in FIGS. 1 and 3; this latter to facilitate feeding wire ropes 26a and 26b through the series of tube 22.

Figure 6B:
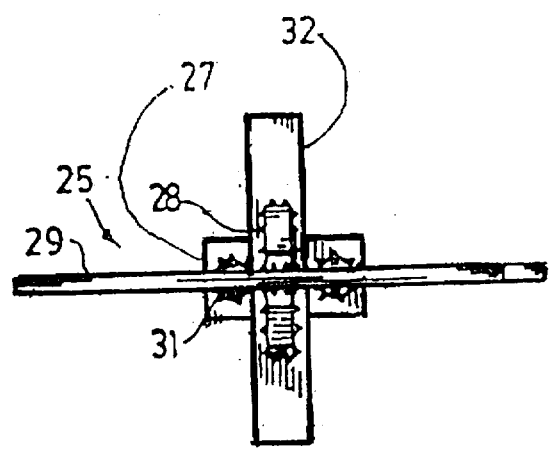
FIGS. 6A, 6B and 6C are detailed side, top and end views respectively of a spade assembly in accordance with the invention.
Figures 6A, 6C:
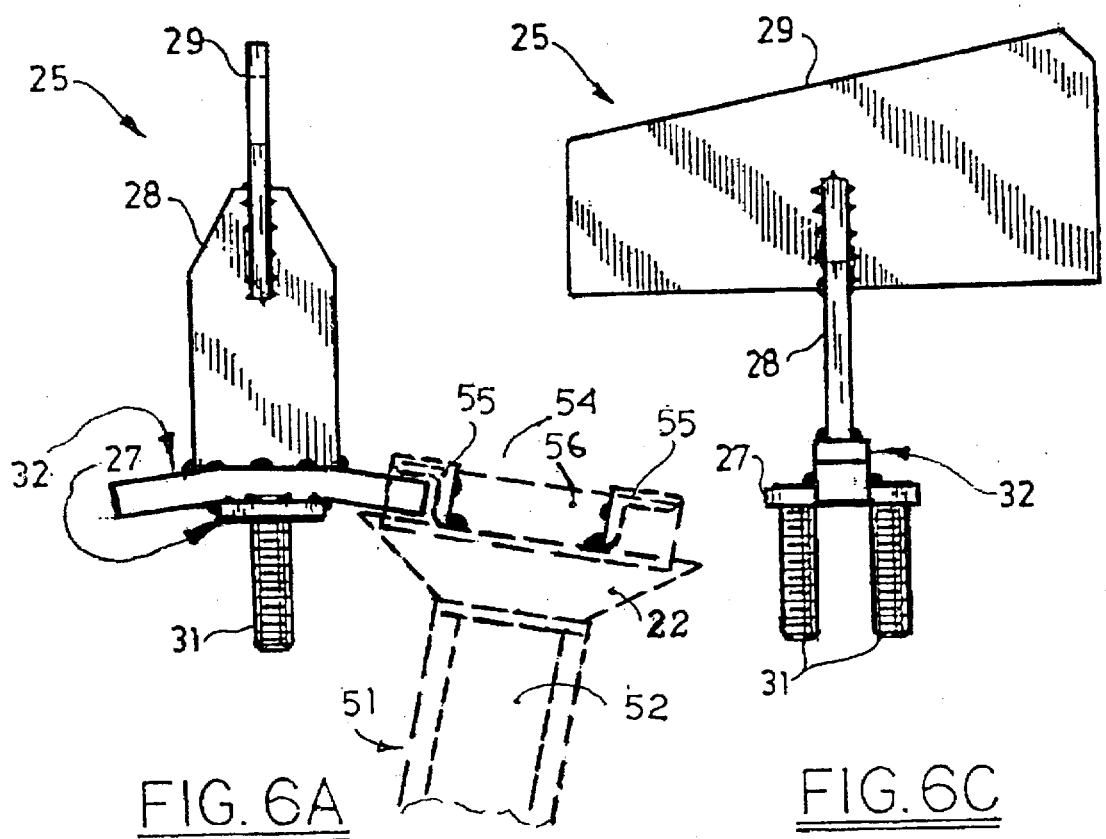

FIGS. 6A, 6B and 6C show a spade assembly 25. To a base 27 two threaded studs 31 are inserted and welded; upon the base 27 a bar 32 is welded; upon the bar 32, and aligned with it, a stem 28 is welded; dovetailed and squarely aligned with the stem 28 is welded a lug 29, made of same flat stock high-strength spring-like steel as that of loop 51—and so dimentioned as to provide considerable surface-area, thereby capable to develope a substantial amount of soil thrust.

This invention depicts the device 17 as having four groups of spade assembly 25 and here shown having four such in each group; all four of which are secured to same piece of wire-rope 26a or 26b. Referring to FIG. 1, the two lower groups are shown in engaged mode of operation for pulling in fields—and each assembly 25 secured to each of the two wire-ropes 26b. The two upper groups, shown in retracted mode for driving on roads, are secured to each of the wire-ropes 26a. The method of securing, comprising a beveled bracket, two bevel washers and two nuts fastened onto the two studs 31, is shown in detail in the above-referenced U.S. Pat. No. 5,242,214; as is the method and means for preforming and preloading the wire-rope for each group as device 17 is assembled.

To obtain a truly "heavy duty" device 17—as indicated in the foregoing-various new and additional elements, which will be described below, are incorporated in the present invention. To explain the need for these, reference is first made to the U.S. Pat. No. 4,402,357: In col. 2, line 7 is an equation expressing the maximum amount of thrust, $T_{max}$, which a wheel can develope in a soil when subjected to shear-stresses—as when deformed by the lug of a farm-tire or the lug 29 of a spade assembly 25 when pulling a drawbar load. In some literature, this equation is referred to as the Micklethwaite's equation, and it can be re-written $$T_{max} = A \times C + W \times \tan\theta$$

wherein the two terms A and W are vehicle-dependent (area and weight);

the two terms C and $\theta$ are soil-dependent (soil-values). From this equation, in effort to maximize the $T_{max}$—and thus the amount of drawbar-pull as well—both the ground contact area, A, and the weight upon a wheel, W, would be as large as practicable. But the values of the terms C and $\theta$—coefficient of cohesion and angle of internal friction, respectively—can not be chosen; they depend on soil-type and soil-moisture; and they increase with depth of soil. Thus, and in regard to rubber-tired and rubber-tracked from vehicles, the soil-values existing in the topsoil are those that count, since rubber-lugs must be wide and only some two inches high (for strength and wear-life); and therefore not capable of interfacing with a stronger sub-surface layer of soil.

To further explain the need for the here added elements, best shown in FIGS. 5 and FIGS. 6, reference is also made to the U.S. Pat. No. 5,242,214. In it is reported that soil becomes stronger with depth: In col. 4, lines 15–24 . . . deals with the so-called Cone Index, a soil-characteristic closely related to the soil-values C and $\theta$ discussed above. And concludes with stating that Cone Index for a certain soil and at "Layer 0–50 mm" was measured to be 596 kPa, i.e. the "strength" of top soil. And, in col.8, lines 15–25 . . . it tells that Cone Index for same soil, but measured at a depth of 100–150 mm, was no less than 902.5 kPa, i.e., the "strength" of sub-surface layer of soil, which is reachable for the lug 29 of spade assembly 25. And thus in essence meaning that by providing means capable of reaching some 100 mm deeper—or four inches deeper—into that soil, the amount of soil-thrust would increase by no less than some 50 percent over that obtainable with lugs made of rubber.

From this observation, coupled with the lug 29 having a a large surface area (typically some 40 square-inches), it can be understood that very high forces are imposed upon not only the spade assemblies 25 but also upon the spadeholder-assemblies 19, 19a and 19b—given that very high soil-resistance does exist, as in "emergency"-situations as listed at the outset and similar soil—and ground-conditions.

It should be understood that also under normal operating conditions a drawbar-tractor should be capable of transmitting as high amount of drawbar pull as possible to its implement. For this reason, and in accordance with the equation listed above, adding extra weight in form of so-called ballast-weight, has been standard practice for several decades. And this, even though this method is only marginally effective-as shown in the following, quoted from GOODYEAR's January 1994 FARM TIRE HANDBOOK in chapter entitled TO OBTAIN MAXIMUM DRAWBAR PULL:

"The effect of added weight will be in proportion to the figures in the following table. For each 100 pounds added to the rear axle of the tractor-usually in the form of liquid fill in the tires or cast iron wheel weights-the average drawbar pull will be increased as indicated:
Average Pull (Pounds) . . .

Concrete Road 70; Dry Clay 55; Sandy Loam 50;

Dry Sand 35; Green Alfalfa 35;

. . . Where the tractor is not properly weighted for drawbar load requirements, excessive wheel slippage will waste time and fuel and result in tearing of the leading edge of the lugs and spin cuts . . . ".

From this, clearly the coefficient of drawbar pull of 0.70 on roads is satisfactory; however, the average for the four soil-conditions is a mere 0.44.

Reference is again made to the U.S. Pat. No. 5,242,214; In col.1 and 2. the test results as reported in the 1986 ASAE-paper No. 86-1067 are discussed. The just cited GOODYEAR-data serve to explain the modest performance of a 140 PTO-hp 2-wheel-drive tractor: it pulled only 5,064 pounds-or 25 percent of its total weight-and this obtained only as rate of wheel-slippage reached 24% (drawbar pull increases with rate of slippage). The paper states that the tractor be equipped to operate "to its best advantage.". Accordingly—and to be properly weighted—it says: ". . . the majority of the tests were run with the 2WD tractor ballasted at 147 lb/PTO-hp . . . ". This amount being in line with findings by NIAE, Silsoe, England in the 1970s, for obtaining optimum traction efficiency. Thus, the weight became no less than 20,516 pounds per Table 2 of paper. Of this, some 5,000 was ballast.

From the scientific findings just listed, the advantages of spade assembly 25 become quite clear: since its lug 29 not only has a large surface area but also—thanks to its material of high-strength spring-like steel—is thin (typically 5/16 inches), it can not only penetrate into the stronger sub-surface layer of soil without need for ballast-weight but also build up a given amount of soil-thrust at a lesser amount of soil-deformation, i.e. lesser rate of slippage, than can a tire; and thereby minimizing soil-compaction and maximizing traction efficiency.

Accompanying these benefits, the lugs 29 are capable of developing extraordinarily high forces, not only in such extreme cases as listed in the foregoing but also when encountering "soft spots" in normal field operations. Such high forces may cause permanent deformation of the loops 51 and the wire ropes 26a and 26b. To prevent this, the present invention incorporates three kinds of flex-limiters as best shown in FIGS. 5A and 5B:

A vertical flex-limiter 52, comprising a piece of flat stock of same high-strength sping-like material as that of loop 51, and welded onto loop 51 at its outer periphery and so dimensioned as to leave a suitable space at its inner periphery when not under load, as shown. As the spade assembly 25 bites into soil, and drawbar pull is being developed, the loop 51 is being compressed not only due to the vertical weight imposed upon it but also due to weight caused by accompanying torque-reaction. Thus, when very high amount of drawbar pull is developed the combined to vertical loads may—without the limiter 52—compress the loop 51 beyond its elastic limit, causing it, as well as the wire rope 26a or 26b, to be permanently deformed. The limiter 52 assures that amount of flexing of loop 51 is within safe limits.

A horizontal flex-limiter 53, comprising two lengths of chain. Each is welded onto the vertical flex-limiter 52 as shown also in FIG. 3. The ends of each is bolted onto each of the two bolted-on spadeholder assembly 19a as shown; this, to facilitate assembling and disassembling of device 17. The limiter 53 assures that amount side-way flexing of loop 51 is within safe limits, as will be discussed.

An expansion-limiter, 57, comprising a piece of three-link chain. It is part of each of the two spadeholder-assemblies 19a and 19b; its first link being welded onto the loop 51 and its third link being welded onto the vertical limiter 52, each positioned to form the configuration as shown in FIGS. 5A and 5B. The limiter 57, assures that each of the four "corner-assemblies" 19a and 19b can not expand beyond safe limit when the device 17 develops high tractive forces, as will be explained. Both of the limiters 53 and 57 function in conjunction with abutment-assembly 54, welded upon tubes 22 as shown in FIGS. 5A and 5B and in the dotted portion of FIG. 6A. The assembly 5 4 consists of two short pieces of angle-iron, 55, each of which is welded onto a steel-strip 56. With spade-assembly 25 in its engaged mode, its movements therewith becomes confined as best seen in FIG. 5A; and this, via the bar 32.

In the process of developing drawbar pull, the spade-assembly 25 reacts by applying radial and tangential forces as well as a turning moment upon its two adjacent spadeholder-assemblies 19; all of these being imposed upon, and transmitted by the bar 32. When in fields, the underside of each end of bar 32 presses upon its tubes 22 as result of inward radial force, due to vertical resistance while penetrating a layer of soil. And one end of bar 32 pushes against vertical leg of angle-iron 55 as result of tangential force, due to resistance in developing the drawbar pull. And for same reason, the spade-assembly 25 is subjected to a turning moment—in opposite direction to that of the drive-wheel—and consequently . . . the upperside of one end of bar 32 pushes outward against horizontal leg of angle-iron 55, while simultaneously the underside of opposite end of bar 32 pushes inward against adjacent tube 22. These various forces are most substantial even in normal operation of device 17.

To indicate their magnitude—relating them with amount of drawbar pull—the following is taken from a 1992 brochure by FIRESTONE: the chart, ". . . based on drawbar pull versus wheel slip tests of two 18.4R38 tires . . . run at Columbiana, Ohio during the summer of 1985. Test surface was clay-loam with 12-inch alfalfa cover. Drawbar pulls were measured as shown in 10%, 15%, and 20% slip ranges.". And the amounts measured for the two Radial All Traction 23° are shown to be, in LBS: 5,920 at 10% slip; 7,000 at 15% slip; 7,960 at 20% slip. Or, about 4,000 pounds of pull was here developed at 20% rate of slippage by one tire. (it also tells that drawbar pull increases with rate of slippage, as noted in the foregoing; here by some 34 percent from 10% to 20%). From these data then, and considering that significantly higher amount of drawbar pull can be developed by the spade-assembly 25, it becomes quite clear that—without the limiting means 52, 53 and 57—the described forces may well result in permanent deformation of the loop 51 during heavy duty pulling. Without the horizontal limiter 53, the amount of side-way flexing of loop 51 may be large enough so that bar 32 no longer is being confined by the pair of angle-iron 55—as the bar 32 reacts due to the build-up of drawbar pull, thus resulting in permanent deformation of wire rope 26a or 26b. Similarly, without the expansion limiter 57 at each of the four "corner-assemblies" 19a and 19b, the loop 51 may expand far enough—due to the outward force against the angle-iron 55 by the bar 32—to cause permanent deformation of the ends of the wire ropes 26a and 26b, thereby making it difficult or even impossible to convert a group of spades expeditiously.

Yet another assembly is incorporated in the present invention to assure product integrity and safe operation of device 17; namely a combination-lock to acertain that each group of spades will stay in its engaged mode during field-operations as well as staying in its retracted mode during high-speed driving, and turning on roads. The arrangement is omitted in the FIG. 1; the base-portion of same is shown on the spadeholder-assemblies 19a and 19b in FIG. 3; the full details are shown in FIGS. 5A and 5B. There are four pair of locks for each device 17; each pair has identical components, but one is arranged to become a right-hand assembly—for securing one end of a wire rope 26a or 26b—and the other is arranged to become a left-hand assembly—for securing the opposite end of a wire rope 26a or 26b. As is shown in FIG. 3 and 4 there are two nuts 66a and 66b, side by side, and welded onto the tube 22 of spadeholder assemblies 19a and 19b, not enumerated. Referring now to FIGS. 5A and 5B, there is shown a right-hand lock-assembly 60a and a left-hand lock-assembly 60b. Specifying here only the assembly 60a, it consists of a sturdy angle-iron 61a, having a nut, hidden and not enumerated, welded onto its vertical leg and on left side as viewed in FIG. 5A. Into this nut is inserted a bolt 62a; this bolt securely screwed into the right-hand nut 66a on the tube 22 in FIG. 3. Thusly arranged, assembly 60a can swivel around the stationary bolt 62a, as indicated with the dotted lines. When in this swiveled position, the bar 32 of spade assembly 25 is being fully exposed, and thusly, the entire group of spade-assemblies secured to the wire rope 26a is then free to be swung into its retracted mode, and this, as the corresponding left-hand lock-assembly at the opposite end of the group is also opened into the swiveled position. Also welded onto the vertical leg of angle-iron 61a is a bar 63a, extending toward tube 22. With the group in its retracted mode, and assemblies 60a and 60b swung back into locking position, as shown in the FIG. 5A, the bars 63, one at each end of the group—would meet the bars 32, and thereby prevent a group of spade-assemblies 25 from accidently becoming engaged.

The lock-assemblies 60a and 60b are held in locking-position, as shown in the FIG. 5A, by two components; and here again referring only to the assembly 60a: firstly, it can not swivel clockwise, because left edge of bar 63a meets right edge of loop 51; secondly, it can not swivel counter-clockwise, because a spring-loaded lock-pawl 64a meets lower edge of a horizontal bar 65, extending along tube 22 and welded onto it, as shown in FIG. 5B. The lock-pawl 64a consists of a regular round-head bolt, a jam-nut securely fastened at its end, and a compression-spring held between the nut and inner wall of vertical leg of angle-iron 61a. To un-lock, pawl 64a is pulled out as indicated in FIG. 5B and, while holding it, the assembly 60a is swung into its dotted position in which it is being held by the spring pushing on the bar 65 while the group of spade-assemblies 25 is converted, upon which it is swung back into its normal position.

The lock-assemblies 60a and 60b keep each group of spade-assemblies 25 safety-locked also when in engaged mode. As best seen in FIG. 5B, the horizontal leg of the sturdy angle-iron 61a and 61b will here meet the bar 32 of the two outermost spade-assemblies 25 should any in the group encounter forces tending to swing away from its engaged mode. The overall method for "unlocking-converting-locking" is same here as when group is in its retracted mode.

Also, a hand-tool—not shown—is provided with each set of the device 17 for expeditious conversion: with it gripping one spade assembly, the entire group is effortlessly changed from one mode to the other. Experience has shown however that farmers generally merely grasp the two mid-assemblies, flipping them; making procedure truly quick and easy.

With the embodiments just described, the objectives are achieved: The three kinds of flex-limiters, 52, 53 and 57, and the lock-assembly 60 assure endurance and reliability not only for everyday heavy duty pulling in fields but they also make the device 17 capable to withstand forces of unforeseen magnitude without damage to its componentry. To be noted, these means do not eliminate flexing of frame assembly 50 and wire ropes 26—they merely limit the amount; and thus, the objective to obtain a smooth ride in fields is still fulfilled.

Further, while the invention has been described in detail with referenced embodiments, it will be understood by those skilled in the art that various changes may be made and equivalents may be substituted for elements thereof without departing from the scope of the invention. In addition, many modifications may be made to adapt the teachings of the invention to a particular situation without departing from the essential scope thereof. Therefore, it is intended that the invention not be limited to the particular embodiments disclosed, but the invention will include all embodiments falling within the scope of the appended claims.

What is claimed is:

1. Retractable traction intensifying means for a rubber tired vehicle having a power driven wheel that includes a tire, a rim, a wheel disc and an axle shaft, comprising:

a plurality of ground engaging spade assemblies, each of said assemblies having a base, a longitudinal bar, a stem and a lug;

a flexible frame means for supporting said spade assemblies having a circular band and a plurality of spade holder assemblies, each of said spade holder assemblies having an inner flexible loop and an outer tube;

a spacer means for securing said circular band of said flexible frame means in spaced apart relationship to a wheel;

a plurality of sturdy wire ropes, each of said ropes being threaded through each of said tube of each of said spade holder assemblies of said flexible frame means and rotatable therein;

a coupling means for fixedly securing said base of each of said spade assemblies to each of said plurality of sturdy wire ropes, whereby a said ground engaging spade assembly can be pivoted by an operator about the longitudinal axis of a said sturdy wire rope to rotate the sturdy wire rope thereabout, thereby moving said ground engaging spade assemblies between a first ground engaging position and a second ground avoiding position, and said spade assemblies are held respectively in said first and second positions by a torsional force exerted by said rotated sturdy wire ropes, and wherein each of said an inner flexible loop having a given height and a given width, and wherein each of said plurality of spade holder assemblies further includes flex-limiting means for restricting compressive deflection to a specified amount of each of said an inner flexible loop, said flex-limiting means comprising vertical abutment means having a height lesser than that of said given height and having a width lesser than that of said given width of said an inner flexible loop, thereby preventing permanent compressive deformation of each of said an inner flexible loop, and allowing for said a plurality of ground engaging spade assemblies to be pivoted into said a second ground avoiding position, wherein each of said a plurality of spade holder assemblies further includes horizontal-flex-limiting means for restricting tangential deflection of each of said an inner flexible loop to a specified amount, said horizontal-flex-limiting means comprising a slidable connective means having two ends, wherein each of said ends is secured to each of said a vertical abutment means, thereby preventing permanent tangential deformation of each of said inner flexible loop.

2. The intensifying means of claim 1, wherein each of said a vertical abutment means comprising a flat plate of spring-steel-like material having a height lesser than said given height of said an inner flexible loop and being secured thereto, and said a flat plate having a width lesser than said given width of said an inner flexible loop.

3. The intensifying means of claim 1, wherein said slidable connective means comprising lengths of chain, forming an endless chain concentric with said circular band, and each of said lengths being secured to each of said a flat plate and at points to provide a specified amount of tangential deflection of each of said an inner flexible loop.

4. The intensifying means of claim 1, comprising spade-lock means for keeping each of said a plurality of ground engaging spade assemblies in said a first ground engaging position, said spade-lock means secured to said an outer tube of said a flexible frame means and having means for pivoting said a plurality of ground engaging spade assemblies into said a second ground avoiding position.

5. The intensifying means of claim 1, comprising spade-lock means for keeping each of said a plurality of ground engaging spade assemblies in said a second ground avoiding position, said spade-lock means secured to said an outer tube of said a flexible frame means and having means for pivoting said a plurality of ground engaging spade assemblies into said a first ground engaging position.

6. Retractable traction intensifying means for a rubber tired vehicle having a power driven wheel that includes a tire, a rim, a wheel disc and an axle shaft, comprising:

a plurality of ground engaging spade assemblies, each of said assemblies having a base, a longitudinal bar, a stem and a lug;

a flexible frame means for supporting said spade assemblies having a circular band and a plurality of spade holder assemblies, each of said spade holder assemblies having an inner flexible loop and an outer tube;

a spacer means for securing said circular band of said flexible frame means in spaced apart relationship to a wheel;

a plurality of sturdy wire ropes, each of said ropes being threaded through each of said tube of each of said spade holder assemblies of said flexible frame means and rotatable therein;

a coupling means for fixedly securing said base of each of said spade assemblies to each of said plurality of sturdy wire ropes, whereby a said ground engaging spade assembly can be pivoted by an operator about the longitudinal axis of a said sturdy wire rope to rotate the sturdy wire rope thereabout, thereby moving said ground engaging spade assemblies between a first ground engaging position and a second ground avoiding position, and said spade assemblies are held respectively in said first and second positions by a torsional force exerted by said rotated sturdy wire ropes, and wherein each of said an inner flexible loop having a given height and a given width, and wherein each of said plurality of spade holder assemblies further includes flex-limiting means for restricting compressive deflection to a specified amount of each of said an inner flexible loop, said flex-limiting means comprising a virtical abutment means having a height lesser than that of said given height and having a width lesser than that of said given width of said an inner flexible loop, thereby preventing permanent compressive deformation of each of said an inner flexible loop, and allowing for said a plurality of ground engaging spade assemblies to be pivoted into said a second ground avoiding position, said a plurality of spade holder assemblies further includes expansion-limiting means for restricting expansive deflection of said an inner flexible loop to a specified amount, said expansion-limiting means comprising a link means having an inward end and an outward end, wherein said inward end is secured to said an inner flexible loop and said outward end is secured to said a vertical abutment means, thereby preventing permanent vertical expansive deformation of said an inner flexible loop.

7. The intensifying means of claims 6, wherein said link means comprising a three-link chain, having an inner-link, a mid-link and an outer-link, wherein said an inner-link is secured to said an inner flexible loop and said outer-link is secured to said a flat plate and Said a mid-link is providing sufficient amount of slack to allow said a flat plate to encounter said an inner flexible loop.

* * * * *